United States Patent
Cain et al.

(10) Patent No.: US 8,966,100 B1
(45) Date of Patent: Feb. 24, 2015

(54) SYSTEM, DEVICE, AND METHOD FOR DISTRIBUTING ACCESS CONTROL INFORMATION IN A COMMUNICATION SYSTEM

(75) Inventors: Bradley Cain, Cambridge, MA (US); Thomas P. Hardjono, Winchester, MA (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 09/660,143

(22) Filed: Sep. 13, 2000

(51) Int. Cl.
- *G06F 15/173* (2006.01)
- *G06F 15/16* (2006.01)
- *G06F 7/04* (2006.01)
- *G06F 17/30* (2006.01)
- *H04L 29/06* (2006.01)

(52) U.S. Cl.
USPC ............. 709/229; 709/225; 726/2; 726/3

(58) Field of Classification Search
USPC .................. 709/229, 230, 251, 252, 238
See application file for complete search history.

(56) References Cited

U.S. PATENT DOCUMENTS

| | | | | |
|---|---|---|---|---|
| 5,289,460 A | * | 2/1994 | Drake et al. | 370/245 |
| 5,570,366 A | * | 10/1996 | Baker et al. | 370/312 |
| 5,636,217 A | * | 6/1997 | Moelard | 370/338 |
| 5,729,542 A | * | 3/1998 | Dupont | 370/346 |
| 5,748,736 A | * | 5/1998 | Mittra | 713/163 |
| 5,852,664 A | * | 12/1998 | Iverson et al. | 705/51 |
| 5,887,252 A | * | 3/1999 | Noneman | 455/463 |
| 5,905,871 A | * | 5/1999 | Buskens et al. | 709/245 |
| 6,049,878 A | * | 4/2000 | Caronni et al. | 726/3 |
| 6,192,417 B1 | * | 2/2001 | Block et al. | 709/249 |
| 6,453,438 B1 | * | 9/2002 | Miller et al. | 714/749 |
| 6,510,515 B1 | * | 1/2003 | Raith | 713/163 |
| 6,625,652 B1 | * | 9/2003 | Miller et al. | 709/227 |
| 6,629,243 B1 | * | 9/2003 | Kleinman et al. | 713/163 |
| 6,711,163 B1 | * | 3/2004 | Reid et al. | 370/390 |
| 6,717,925 B1 | * | 4/2004 | Leppisaari et al. | 370/312 |
| 6,748,447 B1 | * | 6/2004 | Basani et al. | 709/244 |
| 6,791,980 B1 | * | 9/2004 | Li | 370/390 |
| 6,952,733 B1 | * | 10/2005 | Felsman et al. | 709/227 |
| 7,013,389 B1 | * | 3/2006 | Srivastava et al. | 713/163 |
| 7,117,273 B1 | * | 10/2006 | O'Toole et al. | 709/252 |

* cited by examiner

*Primary Examiner* — Azizul Choudhury
(74) *Attorney, Agent, or Firm* — Anderson Gorecki & Rouille LLP

(57) ABSTRACT

A system, device, and method for distributing access control information in a communication system uses a reliable multicast mechanism for distributing access control information by a main server to multiple access control devices. A dedicated multicast group is established for distributing the access control information, and each access control device joins the dedicated multicast group. A reliable multicast mechanism is used to distribute the access control information to the multicast group members. Each access la control device obtains the access control information using the reliable multicast mechanism, and stores the access control information in a database for later use in making receiver access control decisions.

32 Claims, 8 Drawing Sheets

SYSTEM, DEVICE, AND METHOD FOR DISTRIBUTING ACCESS CONTROL INFORMATION IN A COMMUNICATION SYSTEM

CROSS-REFERENCE TO RELATED APPLICATION

The present patent application may be related to the following commonly owned United States patent application, which is hereby incorporated herein by reference in its entirety:

U.S. patent application Ser. No. 09/660,688 entitled SYSTEM, DEVICE, AND METHOD FOR RECEIVER ACCESS CONTROL IN A MULTICAST COMMUNICATION SYSTEM, filed on even date herewith in the names of Bradley Cain and Thomas P. Hardjono.

FIELD OF THE INVENTION

The present invention relates generally to communication systems, and more particularly to distributing access control information in a communication system.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One problem that plagues many multicast communication networks is security, or more specifically, the lack thereof. Many multicast communication networks are based upon an anonymous receiver model in which any host can join the shared tree, for 'example, using multicast group management protocol such as the Internet Group Management Protocol (IGMP). IGMP is described in Fenner, Internet Engineering Task Force (IETF) Request for Comments (RFC) 2236 entitled *Internet Group Management Protocol, Version 2* (Nov. 1997) and in Cain et al., Internet Engineering Task Force (IETF) Internet Draft draft-ietf-idmr-igmp-v3-04.txt entitled *Internet Group Management Protocol, Version 3* (Jun. 2000), which are hereby incorporated herein by reference in their entireties. This anonymous receiver model exposes the shared tree to various types of attacks.

One attempt to protect the shared tree involves the use of data encryption to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Another attempt to protect the shared tree involves the authentication of control messages between multicast routers. Specifically, the multicast routers exchange various control messages for, among other things, joining the shared tree. These control messages are authenticated hop-by-hop according to a predetermined authentication scheme. By authenticating all control messages, only authorized multicast routers are able to join the shared tree.

Unfortunately, neither data encryption nor control message authentication prevents an unauthorized host from joining the shared tree and thereby consuming valuable communication resources. Because authentication operates only between the multicast routers, an unauthorized host can still join the shared tree, specifically by sending a join request, for example, using IGMP or other group management mechanism. The multicast routers establish the appropriate multicast routes for routing multicast packets to the unauthorized host, perhaps even using authentication to perform hop-by-hop authentication. As a member of the shared tree, the unauthorized host receives multicast packets. This is true even if the multicast packets are protected using data encryption, in which case the unauthorized host simply discards the encrypted multicast data.

Thus, a technique for controlling access in a multicast communication network is needed.

SUMMARY OF THE INVENTION

In accordance with one aspect of the invention, access control information is distributed by a main server to multiple access control devices using a reliable multicast mechanism. A dedicated multicast group is established for distributing the access control information, and each access control device joins the dedicated multicast group. A reliable multicast mechanism is used to distribute the access control information to the multicast group members. Each access control device obtains the access control information using the reliable multicast mechanism, and stores the access control information in a database for later use in making receiver access control decisions.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

In a typical embodiment of the present invention, a communication system includes multiple access control devices for making receiver access control decisions. Each access control device is designated for a particular portion of the communication system, and makes receiver access control decisions for subscriber (receiver) devices in its respective portion of the communication system. Specifically, each access control device decides whether to admit a particular subscriber (receiver) to a particular multicast group or reject the subscriber (receiver) based upon certain access control information.

In a communication system having multiple access control devices, access control information must be distributed to each access control device. Distribution of access control information is preferably accomplished in an efficient and reliable manner.

Therefore, in an embodiment of the present invention, access control information is distributed to the multiple access control devices by a main server using a dedicated multicast group and a reliable multicast mechanism. Specifically, the main server and all access control devices support the reliable multicast mechanism. All access control devices join the dedicated multicast group. The main server obtains access control information, for example, through a management interface, and sends the access control information to the access control devices using a multicast group address associated with the multicast group according to the reliable multicast mechanism. Each access control device recovers the access control information using the reliable multicast mechanism and stores the access control information in a database for later use in making receiver access control decisions.

Figure 1:
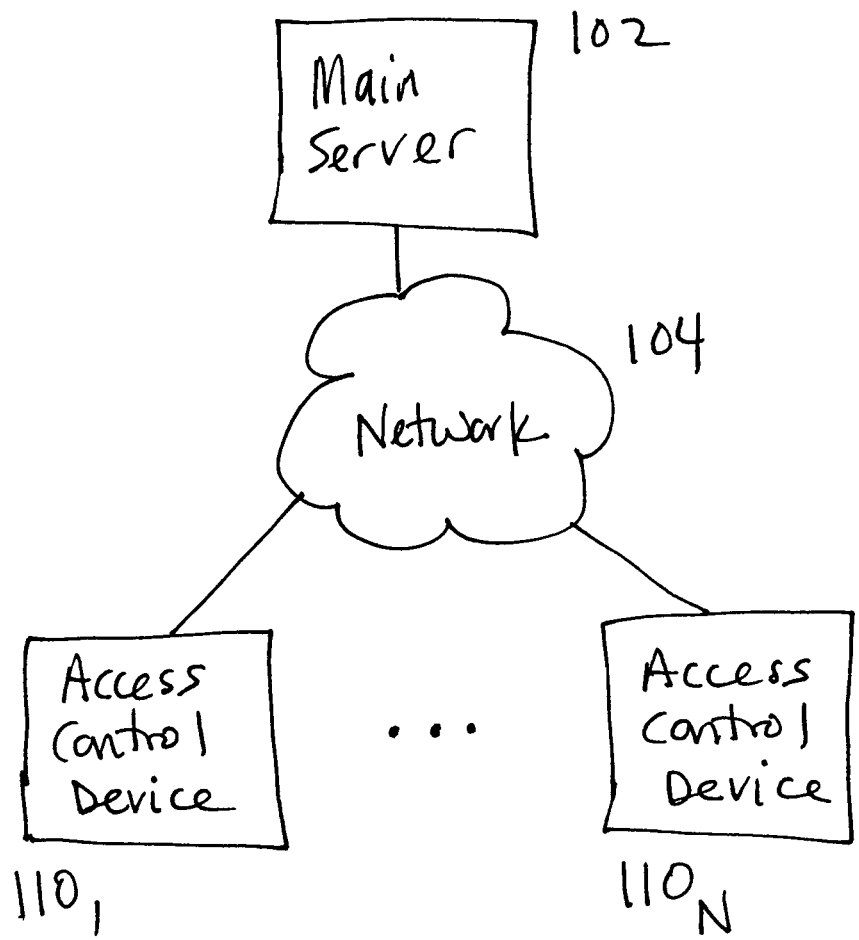
FIG. 1 shows an exemplary communication system including a main server in communication with multiple access control devices over a communication network in accordance with an embodiment of the present invention.

FIG. 1 shows an exemplary communication system 100. The communication system 100 includes a main server 102 in communication with multiple access control devices 110$_1$-110$_N$ (referred to collectively as the access control devices 110 or individually as an access control device 110) over a communication network 104. The communication network 104 supports a multicast distribution tree (shared tree) to which the access control devices 110 are joined. The main server 102 distributes access control information to the access control devices 110 over the shared tree using the reliable multicast mechanism.

Figure 2:
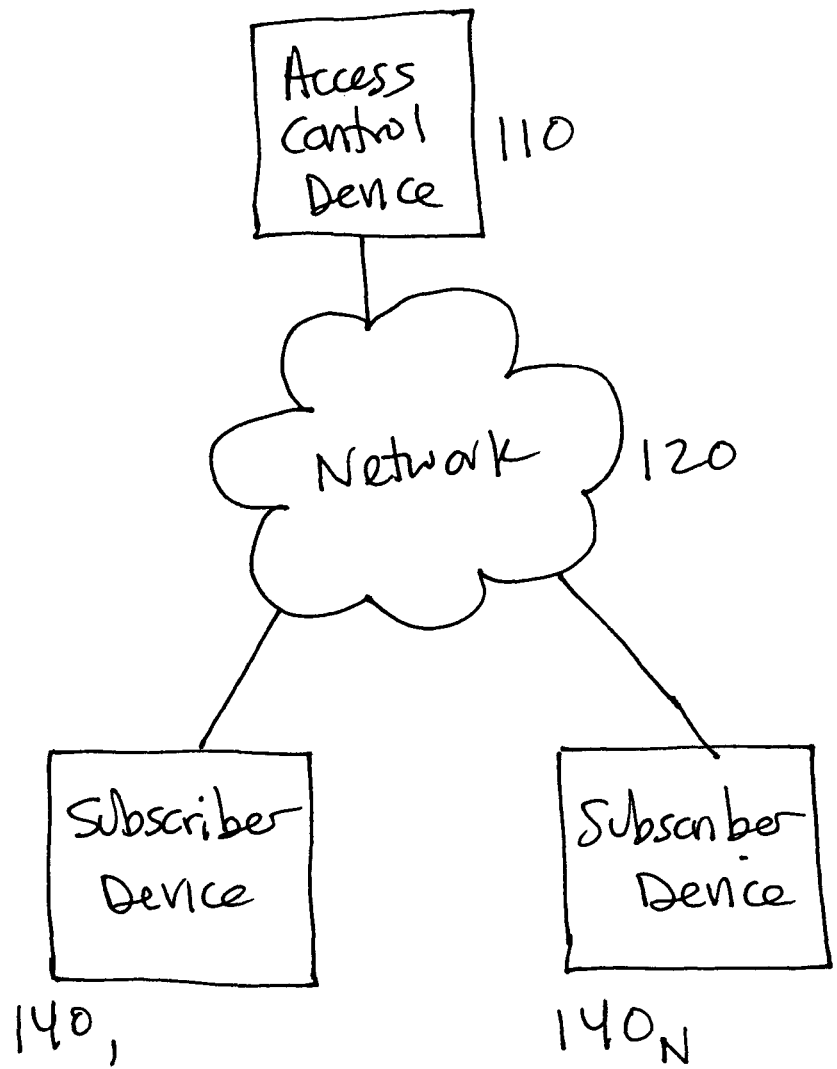
FIG. 2 shows an exemplary portion of a communication system including an access control device supporting a number of subscriber devices in accordance with an embodiment of the present invention.

FIG. 2 shows an exemplary portion of the communication system 100 supported by an access control device 110. The exemplary portion of the communication system 100 includes a number of subscriber devices 140$_1$-140$_N$ (referred to collectively as the subscriber devices 140 and individually as a subscriber device 140) coupled directly or indirectly to the access control device 110 over a communication network 120. The communication network 120 may or may not include various intermediate devices between the access control device 110 and the subscriber devices 140. A subscriber device 140 may or may not be able to communicate with the access control device 110. The access control device 110 makes receiver access control decisions for the subscriber devices 140 based upon access control information received from the main server 102 using the reliable multicast mechanism.

Embodiments of the present invention use any of a variety of reliable multicast mechanisms to distribute the access control information to the multiple access control devices, and the present invention is in no way limited to any particular reliable multicast mechanism or type of reliable multicast mechanism. Without attempting to provide an exhaustive list of reliable multicast mechanisms, embodiments of the present invention may be implemented using any of the following reliable multicast mechanisms:

RMTP (Reliable Multicast Transport Protocol), as described in Montgomery et al, Internet Engineering Task Force (IETF) Internet Draft entitled *The RMTP-II Protocol*, April. 1998;

SRM, as described in Floyd et al, *A Reliable Multicast Framework for Light-weight Sessions and Application Level Framing*, Proc ACM SIGCOMM 95, August. 1995;

a layered reliable multicast mechanism, for example, as described in Luby et al, Internet Engineering Task Force (IETF) Internet Draft draft-ietf-rmt-alc-00.txt, *Asynchronous Layered Coding A Scalable Reliable Multicast Protocol*, Mar. 8, 2000;

TRAM (Tree-based Reliable Multicast), as described in Kadansky et al., Internet Engineering Task Force (IETF) Internet Draft draft-kadansky-tram-02.txt, *Tree-based Reliable Multicast(TRAM)*, January. 2000;

MDP (Multicast Dissemination Protocol), as described in Adamson & Macker, Internet Engineering Task Force (IETF) Internet Draft draft-macker-rmt-mdp-00.txt, *The Multicast Dissemination Protocol (MDP)*, Oct. 22, 1999; and PGM, as described in Speakman et al., Internet Engineering Task Force (IETF) Internet Draft draft-speakman-pgm-spec-04.txt, *PGM Reliable Transport Protocol Specification*, Apr. 10, 2000.

Other reliable multicast mechanisms now in existence or developed in the future may also be used for distributing access control information to the multiple access control devices as described herein, and all such embodiments are intended to fall within the scope of the present invention.

Figure 3:
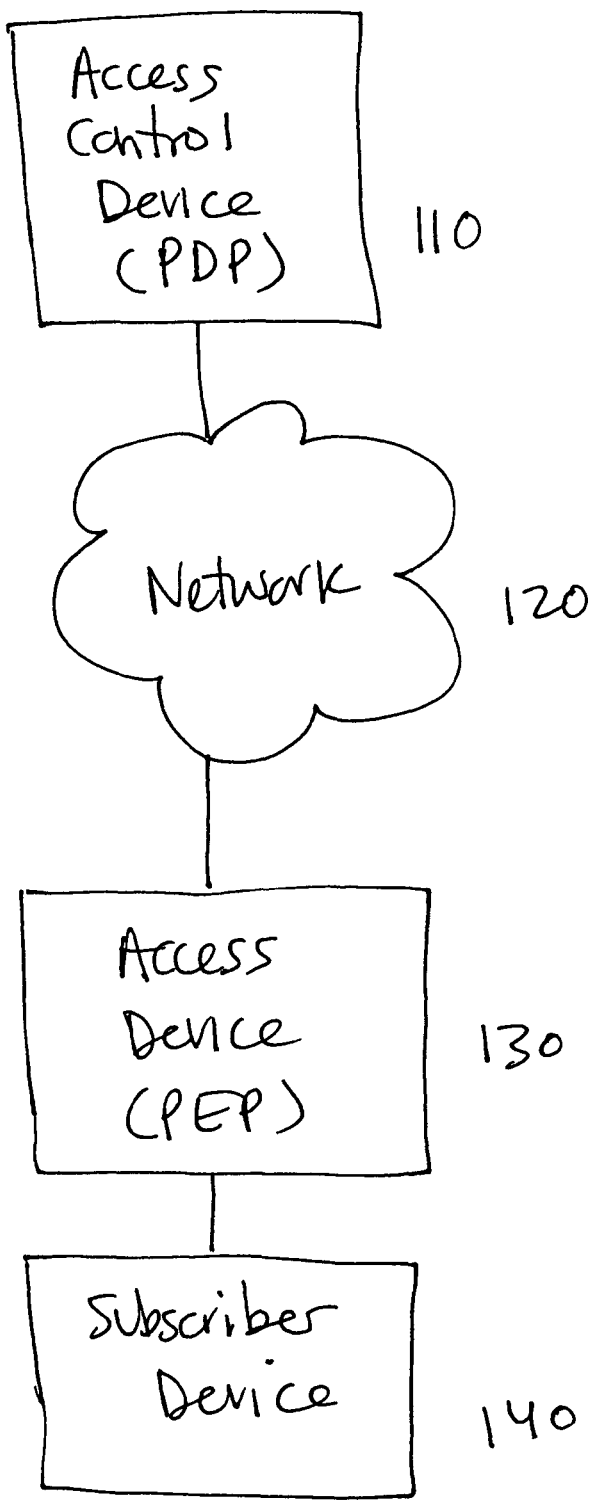
FIG. 3 shows an exemplary portion of a communication system in which a subscriber device accesses the communication network through an access device in accordance with an embodiment of the present invention.

In one exemplary embodiment of the invention, receiver access control is supported using a policy service, as described in the related application (2204/A48). In such an embodiment, a subscriber device 140 accesses the communication network 120 through an access device 130, as shown in FIG. 3. When the subscriber device 140 requests access to a particular multicast group, the access device 130 obtains a policy decision from the access control device 110 indicating whether the subscriber device 140 to the multicast group or reject the subscriber device 140. The access control device 110 uses the policy (access control) information received from the main server 102 to make its policy decision. The access device 130 enforces the policy decision by either admitting the subscriber device 140 to the multicast group or rejecting the subscriber device 140.

The main server 102 and the access control device 110 implement a reliable multicast protocol, such as RMTP or SRM. The access control device 110 joins a well-known multicast group for receiving policy information from the main server 102. The main server 102 sends policy information to the access control device 110 using the well-known multicast group and the reliable multicast protocol. The access control device 110 stores the policy information in a policy database.

Figure 4:
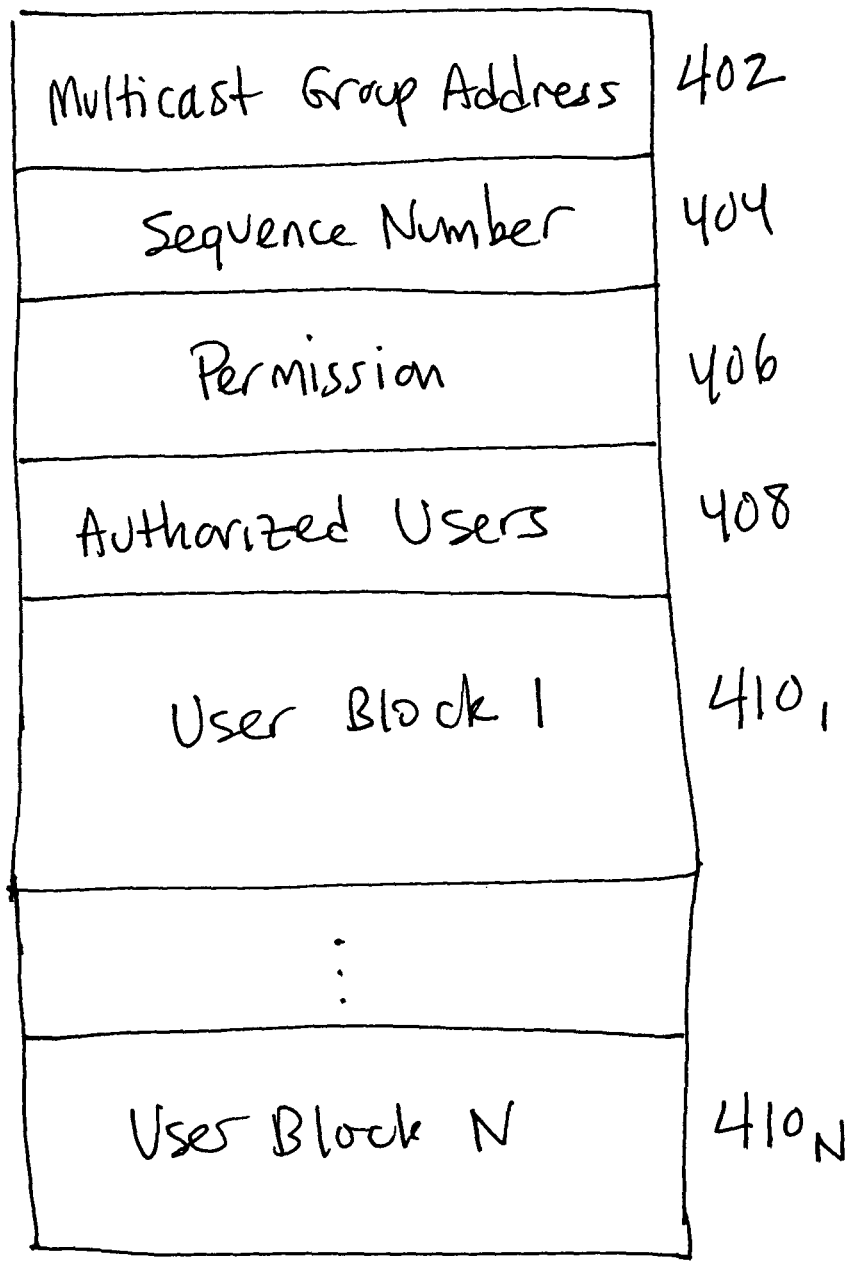
FIG. 4 shows an exemplary policy block including access control information for a multicast group in accordance with an embodiment of the present invention.

The policy information typically includes a number of policy blocks, where each policy block includes policy information for a particular multicast group. As shown in FIG. 4, each policy block typically includes a multicast group address field 402, a sequence number field 404, a permission field 406, an authorized users field 408, and a number of user blocks $410_1$-$410_N$. The multicast group address field 402 indicates the class D multicast group address associated with the multicast group. The sequence number field 404 indicates a sequence number for the policy block, and is used to distinguish between policy blocks for the same multicast group. The permission field 406 indicates whether the multicast group is receive only, send only, or both send and receive. The authorized users field 408 indicates the maximum number of authorized users for the multicast group. Each user block 410 identifies an authorized user for the multicast group.

Figure 5:
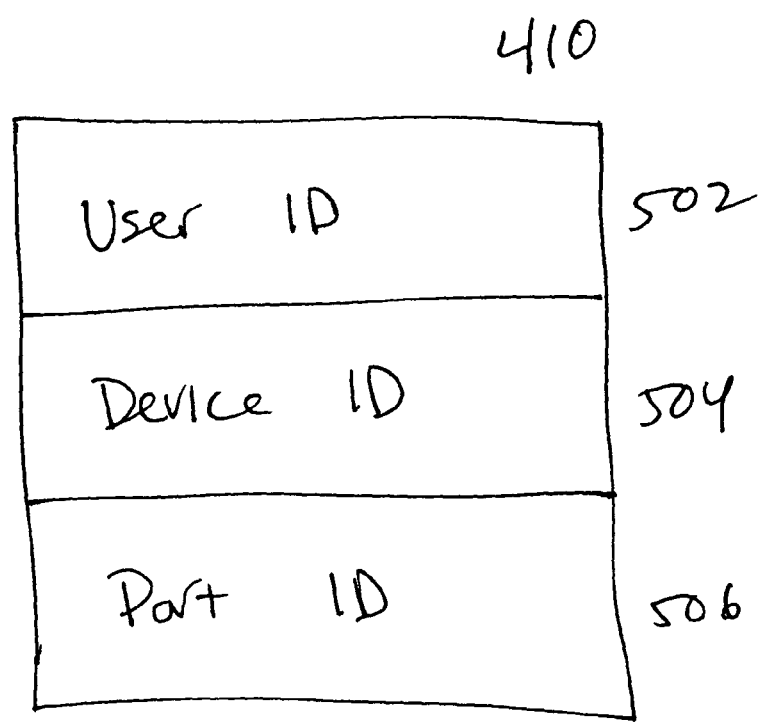
FIG. 5 shows an exemplary user block for identifying a user in accordance with an embodiment of the present invention.

FIG. 5 shows the format of an exemplary user block 410. The exemplary user block 410 typically includes a user identifier field 502, a device identifier field 504, and a port identifier field 506. The user identifier field 502 is a 48-bit field that identifies the user, for example, by a 32-bit IP address or 48-bit Medium Access Control (MAC) address. The device identifier field 504 is a 32-bit field that identifies the device to which the user is attached (e.g., the access device 130). The port identifier field 506 is a 32-bit field that identifies the device port to which the user is attached (e.g., a port of the access device 130).

The access device 130 and the subscriber device 140 implement a multicast group management protocol, such as the IGMP as described in Fenner, Internet Engineering Task Force (IETF) Request for Comments (RFC) 2236 entitled *Internet Group Management Protocol, Version* 2 (November. 1997) and in Cain et al., Internet Engineering Task Force (IETF) Internet Draft draft-ietf-idmr-igmp-v3-04.txt entitled *Internet Group Management Protocol, Version* 3 (June. 2000), which are hereby incorporated herein by reference in their entireties. With respect to the multicast group management protocol, the access device 130 may be referred to as the Multicast Access Point (MAP) for the subscriber devices 140.

The access device 130 and the access control device 110 support a policy service protocol, such as the Common Open Policy Service (COPS) as described in the Internet Engineering Task Force (IETF) Request for Comments (RFC) 2748 entitled *The COPS (Common Open Policy Service) Protocol* (January. 2000), which is hereby incorporated by reference in its entirety, with extensions as described in the related application (2204/A48). With respect to the policy service, the access control device 110 is commonly referred to as the Policy Decision Point (PDP), and the access device 130 is commonly referred to as the Policy Enforcement Point (PEP).

In order to join a multicast group, the subscriber device 140 sends a join request to the access device 130 using the multicast group management protocol. Upon receiving the join request from the subscriber device 140, the access device 130 sends a policy service request message to the access control device 110 requesting a policy decision for the subscriber device 140. Upon receiving the policy service request message from the access device 130, the access control device 110 determines a policy decision for the subscriber device 140 based upon the access control information received from the main server 102, and sends a policy service decision message including the policy decision to the access device 130. The access device 130 enforces the policy decision, specifically by admitting the subscriber device 140 to the multicast group if and only if the policy decision indicates that the subscriber device 140 can be admitted to the multicast group.

Figure 6:
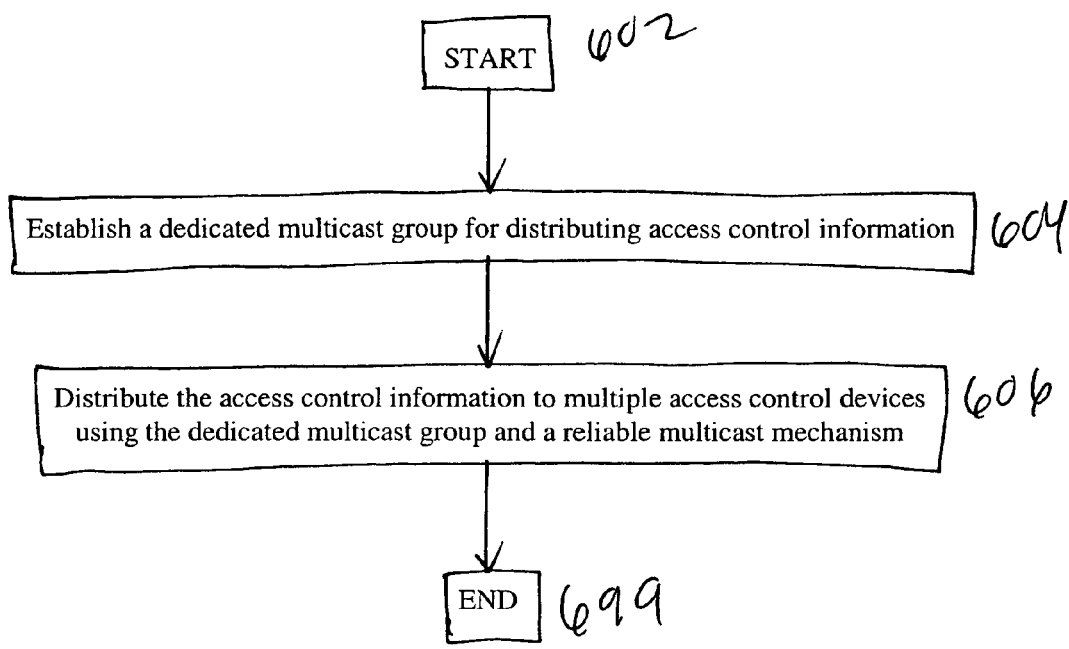
FIG. 6 is a logic flow diagram showing exemplary logic for distributing access control information.

FIG. 6 is a logic flow diagram showing exemplary logic 600 for distributing access control information. Beginning at block 602, the logic establishes a dedicates multicast group for distributing access control information, in block 604, and distributes the access control information to multiple access control devices using the dedicated multicast group and a reliable multicast mechanism, in block 606. The logic 600 terminates in block 699.

Figure 7:
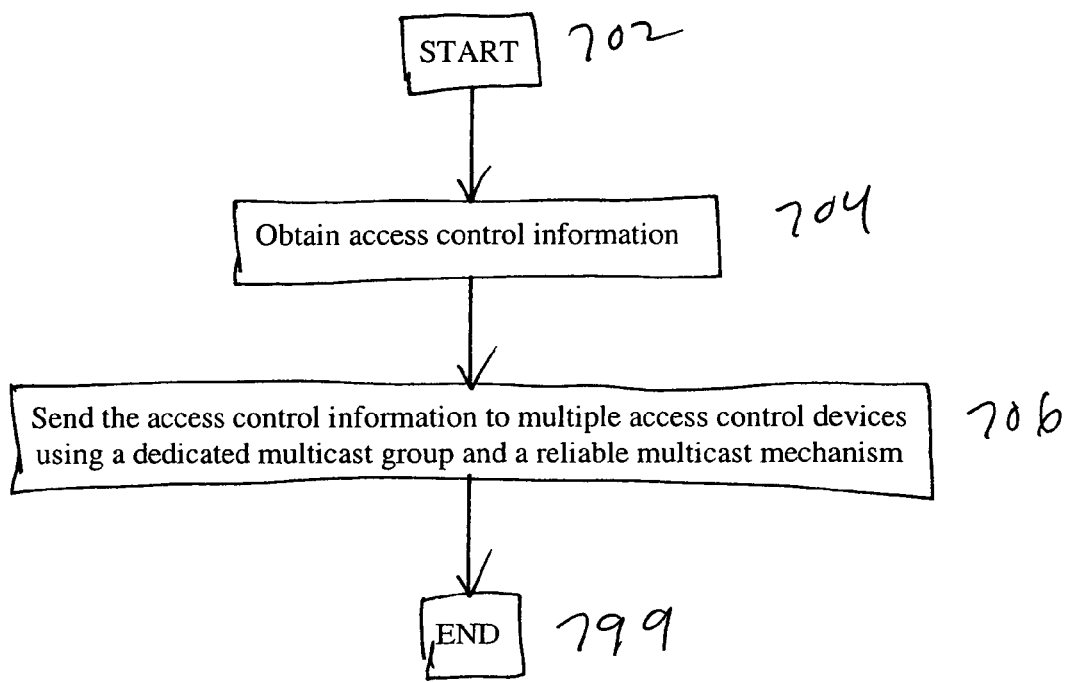
FIG. 7 is a logic flow diagram showing exemplary main server logic for distributing access control information.

FIG. 7 is a logic flow diagram showing exemplary main server logic 700 for distributing access control information. Beginning at block 702, the logic obtains access control information, in block 704, and sends the access control information to multiple access control devices using a dedicated multicast group and a reliable multicast mechanism, in block 706. The logic 700 terminates in block 799.

Figure 8:
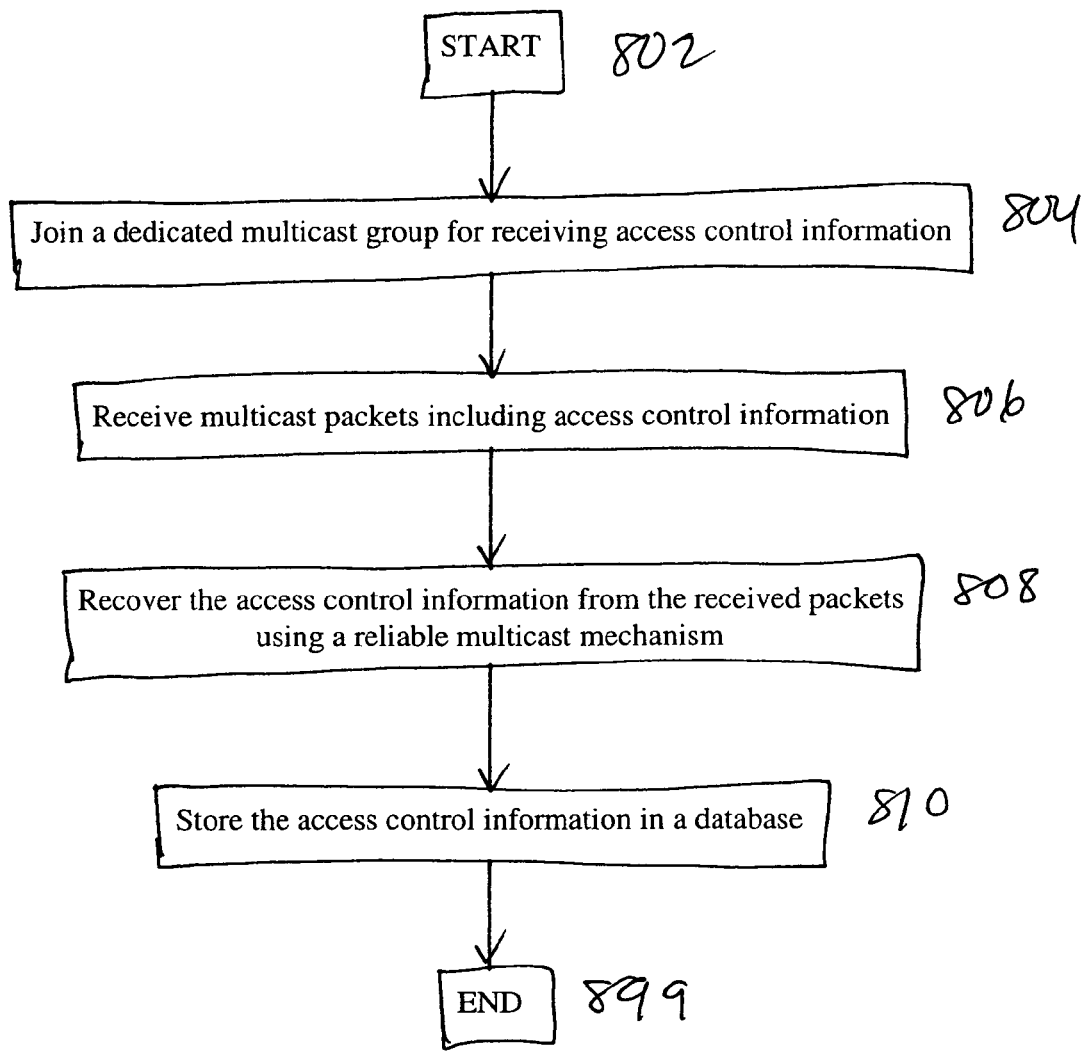
FIG. 8 is a logic flow diagram showing exemplary access control device logic for receiving access control information.

FIG. 8 is a logic flow diagram showing exemplary access control device logic 800 for receiving access control information. Beginning at block 802, the logic joins a dedicated multicast group for receiving access control information, in block 804. The logic receives multicast packets including access control information over the dedicated multicast group, in block 806, and recovers the access control information from the received packets using a reliable multicast mechanism, in block 808. The logic stores the access control information in a database, in block 810. The logic 800 terminates in block 899.

It should be noted that the terms such as "server" and "router" are used herein to describe various communication devices that may be used in a communication system, and should not be construed to limit the present invention to any particular communication device type. Thus, a communication device may include, without limitation, a bridge, router, bridge-router (brouter), switch, node, server, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an combination thereof. In a typical embodiment of the present invention, predominantly all of the described logic is implemented as a set of computer program instructions that is converted into a computer executable form, stored as such in a computer readable medium, and executed by a microprocessor within the appropriate device (i.e., the main server and the access control devices) under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the 154 source code may be converted (e.g., via a translator, assembler, or compiler) into a computer executable form:

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

We claim:

1. A method for distributing access control information in a communication network for managing access by a subscriber device to a multicast group, the method comprising:
   obtaining access control information by a main device;
   sending the access control information by the main device to a plurality of access control devices using a reliable multicast mechanism, the access control information including at least one policy block, the policy block including a multicast group address field, a sequence number field and a number of user blocks identifying authorized users for the multicast group;
   in response to a join request sent from the subscriber device to an access device which is in direct communication with the subscriber device, generating a policy service request message and sending the policy service request message from the access device to one of the access control devices;
   in response to receipt of the policy service request message by the access control device, determining a policy decision for the subscriber device based on the access control information received from the main device, and sending a corresponding policy service decision message to the access device; and
   implementing the policy decision with the access device.

2. The method of claim 1, wherein the access control devices are policy decision point devices for a policy service.

3. The method of claim 1, wherein sending the access control information by the main device to the plurality of access control devices using the reliable multicast mechanism comprises:
   establishing a multicast distribution tree from the main device to the plurality of access control devices; and
   sending the access control information by the main device to the plurality of access control devices over the multicast distribution tree.

4. The method of claim 3, wherein establishing the multicast distribution tree from the main device to the plurality of access devices comprises:
   establishing a dedicated multicast group for distributing the access control information; and
   joining the dedicated multicast group by each of the plurality of access control devices.

5. The method of claim 4, wherein sending the access control information by the main device to the plurality of access control devices over the multicast distribution tree comprises:
   sending the access control information by the main device to the plurality of access control devices using a multicast group address associated with the multicast group.

6. The method of claim 1, further comprising:
receiving the access control information by the access control device using the reliable multicast mechanism; and
storing the access control information in a database.

7. A method for distributing access control information by a communication device for managing access by a subscriber device to a multicast group, the method comprising:
obtaining access control information, the access control information including at least one policy block, the policy block including a multicast group address field, a sequence number field and a number of user blocks identifying authorized users for the multicast group;
sending the access control information to a plurality of access control devices using a reliable multicast mechanism;
in response to a join request sent from the subscriber device to an access device which is in direct communication with the subscriber device, generating a policy service request message and sending the policy service request message from the access device to one of the access control devices;
in response to receipt of the policy service request message by the access control device, determining a policy decision for the subscriber device based on the access control information, and sending a corresponding policy service decision message to the access device; and
implementing the policy decision with the access device.

8. The method of claim 7, wherein sending the access control information to the plurality of access control devices using the reliable multicast mechanism comprises:
establishing a multicast distribution tree to the plurality of access control devices; and
sending the access control information to the plurality of access control devices over the multicast distribution tree.

9. Apparatus for distributing access control information in a communication network for managing access by a subscriber device to a multicast group comprising:
a main server device configured to obtain access control information and to send the access control information to a plurality of access control devices using a reliable multicast mechanism, the access control information including at least one policy block, the policy block including a multicast group address field, a sequence number field and a number of user blocks identifying authorized users for the multicast group; and
an access device in direct communication with the subscriber device and in communication with a coupled one of the access control devices, the access device being responsive to a join request sent from the subscriber device to generate a policy service request message and send that message to the coupled access control device, the coupled access control device being responsive to the policy service request message to determine a policy decision for the subscriber device based on the access control information, and sending a corresponding policy service decision message to the access device, the access device being responsive to the policy service decision message to implement the policy decision.

10. The apparatus of claim 9, wherein the main server device is configured to establish a multicast distribution tree to the plurality of access control devices and to send the access control information to the plurality of access control devices over the multicast distribution tree.

11. The apparatus of claim 9, wherein the reliable multicast mechanism comprises RMTP (Reliable Multicast Transport Protocol).

12. The apparatus of claim 9, wherein the reliable multicast mechanism comprises SRM (Scalable Reliable Multicast).

13. The apparatus of claim 9, wherein the reliable multicast mechanism comprises TRAM (Tree-based Reliable Multicast).

14. The apparatus of claim 9, wherein the reliable multicast mechanism comprises MDP (Multicast Dissemination Protocol).

15. The apparatus of claim 9, wherein the reliable multicast mechanism comprises layered reliable multicast.

16. The apparatus of claim 9, wherein the reliable multicast mechanism comprises PGM (Pragmatic General Multicast) Reliable Transport Protocol.

17. A computer program stored on a non-transitory computer readable medium for distributing access control information in a communication network and managing access by a subscriber device to a multicast group, the computer program comprising:
instructions executed by a main server including:
at least one management instruction that obtains access control information; and
at least one distribution instruction that sends the access control information to a plurality of access control devices using a reliable multicast mechanism, the access control information including at least one policy block, the policy block including a multicast group address field, a sequence number field and a number of user blocks identifying authorized users for the multicast group;
instructions executed by an access device which is in direct communication with the subscriber device including:
at least one request processing instruction that generates a policy service request message in response to a join request sent from the subscriber device, and
at least one communication instruction that sends the policy service request message to one of the access control devices; and
functions executed by the one of the access control devices including:
at least one policy instruction that determines a policy decision for the subscriber device based on the access control information in response to receipt of the policy service request message, and
at least one communication instruction that sends a corresponding policy service decision message to the access device,
whereby the policy decision is implemented with the access device.

18. The computer program of claim 17, wherein the at least one distribution instruction establishes a multicast distribution tree to the plurality of access control devices and sends the access control information to the plurality of access control devices over the multicast distribution tree.

19. A method for obtaining access control information by a communication device and employing that information to manage access by a subscriber device to a multicast group, the method comprising:
joining a dedicated multicast group for receiving access control information; and
receiving access control information from the dedicated multicast group using a reliable multicast mechanism, the access control information including at least one policy block, the policy block including a multicast group address field, a sequence number field and a number of user blocks identifying authorized users for the multicast group; and in response to a policy service request message from an access device which is in direct communication with a subscriber device, determining a policy decision for the subscriber device associated with the request message based on the access control information, and sending a corresponding policy service decision message to the access device, whereby the policy decision is implemented with the access device.

20. The method of claim 19, wherein receiving access control information from the dedicated multicast group using the reliable multicast mechanism comprises:

receiving multicast packets for the dedicated multicast group; and recovering the access control information from the received packets using the reliable multicast mechanism.

21. The method of claim 19, further comprising:

storing the access control information in a database.

22. An apparatus comprising:

an access control device configured to obtain access control information from a main device, to join a dedicated multicast group, to receive access control information distributed to the dedicated multicast group via reliable multicast, the access control information including at least one policy block, the policy block including a multicast group address field, a sequence number field and a number of user blocks identifying authorized users for the multicast group, to determine a policy decision for the subscriber device associated with the request message based on the access control information, and to send a corresponding policy service decision message to the access device, whereby the policy decision is implemented with the access device.

23. The apparatus of claim 22, wherein the reliable multicast comprises RMTP (Reliable Multicast Transport Protocol).

24. The apparatus of claim 22, wherein the reliable multicast comprises SRM (Scalable Reliable Multicast).

25. The apparatus of claim 22, wherein the reliable multicast comprises TRAM (Tree-based Reliable Multicast).

26. The apparatus of claim 22, wherein the reliable multicast comprises MDP (Multicast Dissemination Protocol).

27. The apparatus of claim 22, wherein the reliable multicast comprises layered reliable multicast.

28. The apparatus of claim 22, wherein the reliable multicast comprises PGM (Pragmatic General Multicast) Reliable Transport Protocol.

29. A computer program stored on a non-transitory computer readable medium for controlling an access control device for obtaining access control information from a main device and employing that information to manage access by a subscriber device to a multicast group, the computer program comprising:

at least one multicast group management instruction that joins a dedicated multicast group and receives access control information distributed to the dedicated multicast group via reliable multicast, the access control information including at least one policy block, the policy block including a multicast group address field, a sequence number field and a number of user blocks identifying authorized users for the multicast group; and at least one access control instruction that determines, in response to a policy service request message from an access device which is in direct communication with the subscriber device, a policy decision for the subscriber device associated with the request message based on the access control information, and that sends a corresponding policy service decision message to the access device, whereby the policy decision is implemented with the access device.

30. A communication system comprising:

a main server device in communication with a plurality of access control devices over a communication network, wherein the main server device is configured to distribute access control information to the plurality of access control devices using a reliable multicast mechanism, the access control information including at least one policy block, the policy block including a multicast group address field, a sequence number field and a number of user blocks identifying authorized users for the multicast group, and wherein in response to a join request sent from a subscriber device to an access device, which is in direct communication with the subscriber device, the access device generates a policy service request message and sends the policy service request message to one of the access control devices, and wherein in response to receipt of the policy service request message the access control device determines a policy decision for the subscriber device based on the access control information received from the main server device, and sends a corresponding policy service decision message to the access device, whereby the policy decision is implemented with the access device.

31. The communication system of claim 30, wherein the main server device is configured to establish a dedicated multicast distribution tree to the plurality of access control devices and distribute the access control information to the plurality of access control devices over the dedicated multicast distribution tree using the reliable multicast mechanism.

32. The communication system of claim 31, wherein each access control device is configured to join the dedicated multicast distribution tree for receiving the access control information from the main server device.

* * * * *